(12) United States Patent
Hong et al.

(10) Patent No.: US 12,339,665 B2
(45) Date of Patent: Jun. 24, 2025

(54) DOCKING SYSTEM AND ASSOCIATED METHOD

(71) Applicant: Ford Global Technologies, LLC, Dearborn, MI (US)

(72) Inventors: Sanghyun Hong, Ann Arbor, MI (US); Kurt Michael Lundeen, Novi, MI (US); Justin Miller, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 314 days.

(21) Appl. No.: 18/173,923

(22) Filed: Feb. 24, 2023

(65) Prior Publication Data

US 2024/0288869 A1    Aug. 29, 2024

(51) Int. Cl.
*G05D 1/00* (2006.01)
*B60L 53/14* (2019.01)
*B60L 53/36* (2019.01)
*B60L 53/37* (2019.01)

(52) U.S. Cl.
CPC ............ *G05D 1/0225* (2013.01); *B60L 53/14* (2019.02); *B60L 53/36* (2019.02); *B60L 53/37* (2019.02); *G05D 1/0234* (2013.01); *G05D 1/0248* (2013.01)

(58) Field of Classification Search
CPC .. G05D 1/0225; G05D 1/0234; G05D 1/0248; B60L 53/14; B60L 53/36; B60L 53/37; B60L 53/30; B60L 53/80; B62D 63/02; B62D 63/04; B60S 5/06
USPC ......................................................... 701/23
See application file for complete search history.

(56) References Cited

U.S. PATENT DOCUMENTS

| | | | | |
|---|---|---|---|---|
| 10,365,656 B2 * | 7/2019 | Moore | .................. | G05D 1/024 |
| 2021/0146552 A1 * | 5/2021 | Hong | .................. | A47L 9/2852 |
| 2022/0194245 A1 * | 6/2022 | Gonano | .............. | G05D 1/0214 |

FOREIGN PATENT DOCUMENTS

| | | | |
|---|---|---|---|
| CN | 107037807 A | | 8/2017 |
| CN | 216454808 | * | 5/2022 |
| KR | 102014340 B1 | | 8/2019 |

OTHER PUBLICATIONS

S Vongbunyong, et al., Automatic Precision Docking for Autonomous Mobile Robot in Hospital Logistics—Case-Study: Battery Charging, The 11th International Conference on Mechanical Engineering, IOP Conf. Series: Materials Science and Engineering, 2020, 1-8.

* cited by examiner

*Primary Examiner* — Muhammad Shafi
(74) *Attorney, Agent, or Firm* — Emily Drake; Eversheds Sutherland (US) LLP

(57) ABSTRACT

A docking system is provided. The docking system includes a docking station and an autonomous mobile robot (AMR). The AMR includes a processor, a camera electrically connected to the processor, a lidar system electrically connected to the processor, and a memory. The memory may have instructions that, when executed by the processor, cause the processor to perform operations including employ the camera and the lidar system to determine an offset position and a final position of the AMR with respect to the docking station, and dock the AMR at the docking station using the offset and final positions.

8 Claims, 3 Drawing Sheets

DOCKING SYSTEM AND ASSOCIATED METHOD

BACKGROUND

Autonomous Mobile Robots (AMRs) are commonly used in the transportation ecosystem in order to meet the demand of delivery due to increased online shopping. When using an AMR in new transportation ecosystems, the AMR consumes a lot of electrical energy. In this manner, with battery powered AMRs, the batteries may be re-charged and/or re-placed with a charged battery. AMRs are able to interact autonomously with the world around them, including loading and unloading packages. For example, an AMR may be configured to use a package conveyor system to load and unload packages into its own cargo space. When the AMRs charge/replace batteries and load/unload packages, it is common for the AMRs to dock at docking stations, such as battery stations and package lockers.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
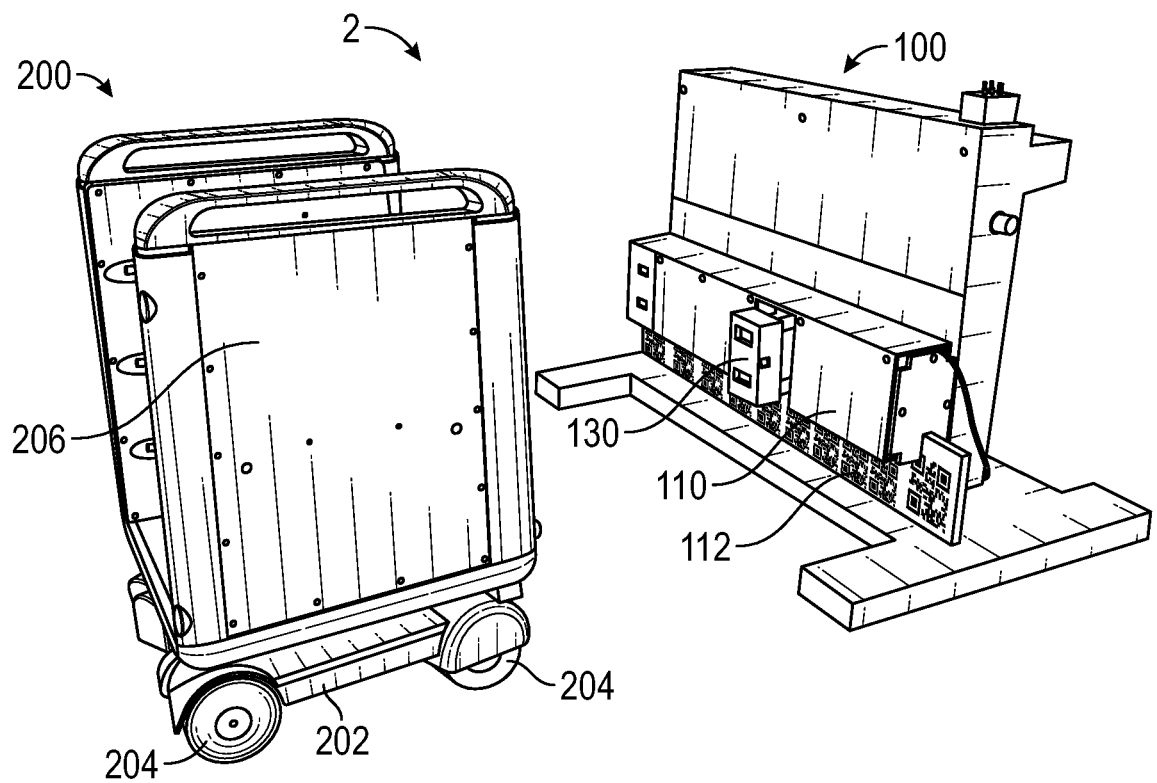
FIG. 1 is an isometric view of a docking system, in accordance with one non-limiting embodiment of the disclosed concept.

The systems and methods disclosed herein assist at least in part in precisely docking an Autonomous Mobile Robot (AMR) with a docking station. The AMR may be precisely docked at the docking station in a plurality of different ways and for a plurality of different reasons. For example, the AMR may include a battery and precise docking at the docking station may be performed to charge the battery, replace the battery, and/or allow for loading and unloading of packages. Additionally, the AMR may further include a processor, a memory, a camera, and a lidar system. The memory may have instructions that cause the processor to employ the camera and the lidar system to determine an offset position and a final position of the AMR with respect to the docking station, and dock the AMR at the docking station using the offset and final positions.

By employing both the camera of the AMR and the lidar system of the AMR, relatively precise docking is able to be achieved. That is, the combined effect of data from the camera and data from the lidar system advantageously allows the processor to precisely determine the offset and final positions, which in turn cause the AMR to dock at the docking station. Additionally, in one example, the docking station has a barcode and the camera of the AMR is employed to scan the barcode and estimate an actual position of the AMR with respect to the docking station. Moreover, the lidar system may be configured to detect a middle point of the docking station, and provide feedback to the processor of the AMR, thereby allowing the processor to determine the offset and final positions. Once the offset and final positions are determined, the processor can cause the AMR to first move to the offset position, and then move to the final position, for docking.

In another example, the docking system may include a camera. The camera may be coupled to a structure of the docking station (e.g., may be spaced from and be apart from the AMR), and/or may be spaced from both the AMR and the docking station (e.g., be coupled to a wall of a warehouse in which the AMR is operating). In turn, the camera may take footage of the AMR, and that footage may be transmitted to the processor of the AMR, to make precise docking with the docking station even more robust. Furthermore, the AMR may or may not have a barcode on it, e.g., one that can be scanned by the aforementioned camera, in order to make positioning itself simpler. It will be appreciated that a docking system in accordance with the disclosed concept may include any one or combination of the aforementioned precision docking capabilities (e.g., receiving of data from the cameras of the AMR, docking station, or warehouse, and/or data from the lidar system of the AMR).

Additionally, in another example the docking system may include a track, and the track may allow the AMR to be passively aligned with the docking station during docking. The track may include a body and a tapered portion. In one example, the tapered portion allows the AMR to be directed toward the docking station during docking. That is, during docking, the tapered portion may be engaged by the AMR and cause the AMR to be directed into proper alignment. This may help with moving the AMR from the offset position to the final position.

These and other advantages of the present disclosure are provided in greater detail herein.

Illustrative Embodiments

As employed herein, the term "coupled" shall mean connected together either directly or via one or more intermediate parts or components.

Figure 3:
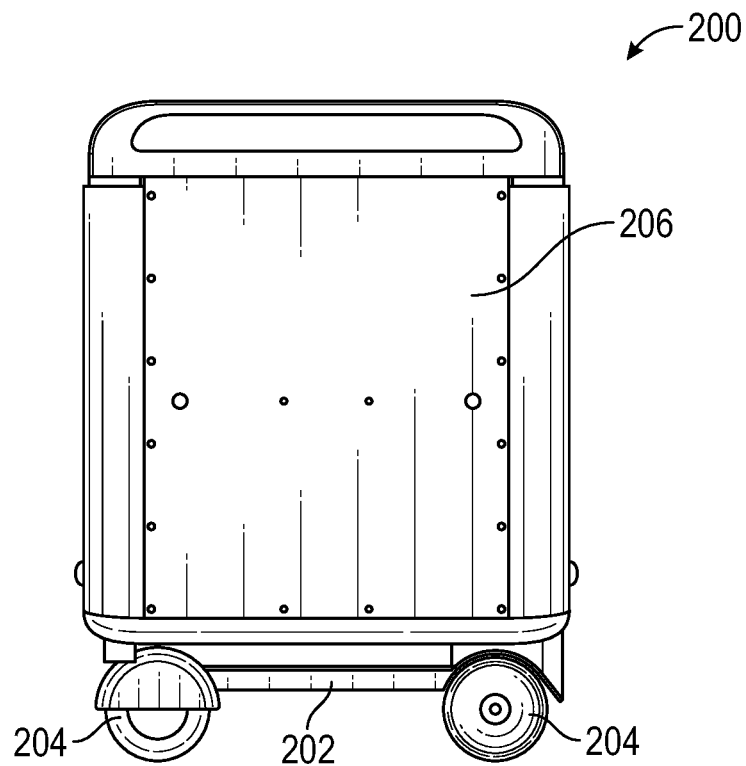
FIG. 3 is a side view of an AMR for the system of FIG. 2.

FIG. 1 shows a docking system 2, in accordance with one non-limiting embodiment of the disclosed concept. The docking system 2 includes a docking station 100 and an autonomous mobile robot (e.g., AMR 200, also shown in FIG. 3) configured to move independently with respect to the docking station 100. The AMR 200 may include a body 202, a plurality of wheels 204 coupled to the body 202 and configured to allow the body 202 to roll on a surface, and a Top hat system 206 mounted to the body 202 for storage of a package. The Top hat system 206 may be instrumented with its own sensor suite, including lidar systems and cameras. Additionally, the AMR 200 may be configured to dock at the docking station 100 for a number of reasons, including battery re-charging, battery replacement, and package loading and unloading. When the AMR 200 is docking at the docking station 100, it is important that the AMR 200 be precisely aligned with the docking station 100. In accordance with the disclosed concept, the docking system 2 advantageously provides for relatively precise docking between the AMR 200 and the docking station 100.

Figure 2:
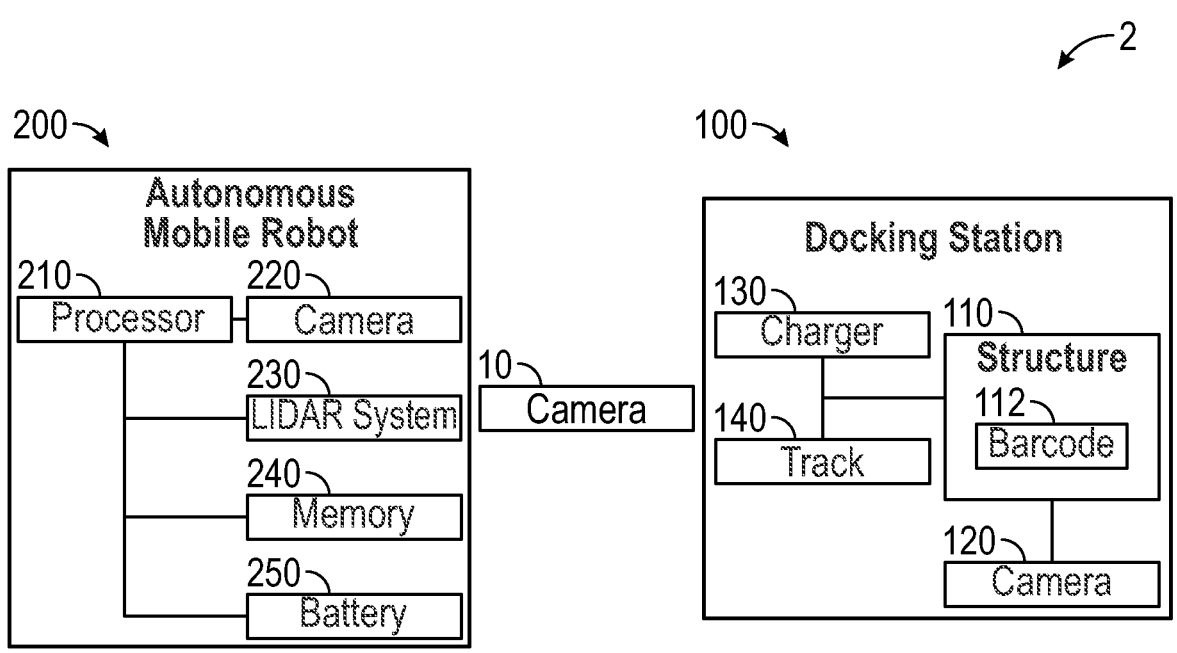
FIG. 2 is a simplified view of the docking system of FIG. 1, shown with an additional camera.

FIG. 2 shows a simplified view of the docking system 2. As shown, the docking station 100 includes a structure 110 having a barcode 112, a camera 120 coupled to the structure 110, a charger 130 coupled to the structure 110 and configured to charge the battery 250 of the AMR 200, and a track 140 extending outwardly from the structure 110. Various aspects of the docking system 2 will be shown only in certain of the other FIGS. provided herein (e.g., the track 140 is only shown in FIG. 5), for ease of illustration. Continuing to refer to FIG. 2, the AMR 200 further includes a processor 210, a camera 220 electrically connected to the processor 210, a lidar system 230 electrically connected to the processor 210, a memory 240, and a battery 250 electrically connected to the processor 210. In one example, the charger 130 (see also FIG. 1) of the docking station 100 may be configured to charge the battery 250 of the AMR 200, for example when the AMR 200 is in a docked position, with respect to the docking station 100. In another example, the docking station 100 may also and/or additionally be configured to replace the battery 250 of the AMR 200.

As will be discussed in greater detail below, the memory 240 of the AMR 200 may include instructions that, when executed by the processor 210, cause the processor 210 to perform operations including employing the camera 220 and the lidar system 230 to determine an offset position 300 (FIG. 4) and a final position 302 (FIG. 4) of the AMR 200 with respect to the docking station 100, and docking the AMR 200 at the docking station 100 using the offset and final positions 300,302. It will be appreciated that while the disclosed concept is being described in association with the offset and final positions 300,302 being used to dock the AMR 200, the AMR 200 may use feedback to navigate to one single point, to multiple positions (e.g., trajectory/waypoints), and/or may simply navigate continuously.

However, by moving to the offset position 300 first, and then to the final position 302 thereafter, the AMR 200 has a better chance of precisely aligning with the docking station 100, and also has an increased success rate of precise docking. Stated differently, once the AMR 200 determines the offset and final positions 300,302 with respect to a position of the docking station 100 (i.e., a coordinate frame attached on the docking station 100), the AMR 200 utilizes an estimated relative position between the AMR 200 and the docking station 100 as feedback signals for approaching the offset and final positions 300,302 precisely.

Figure 4:
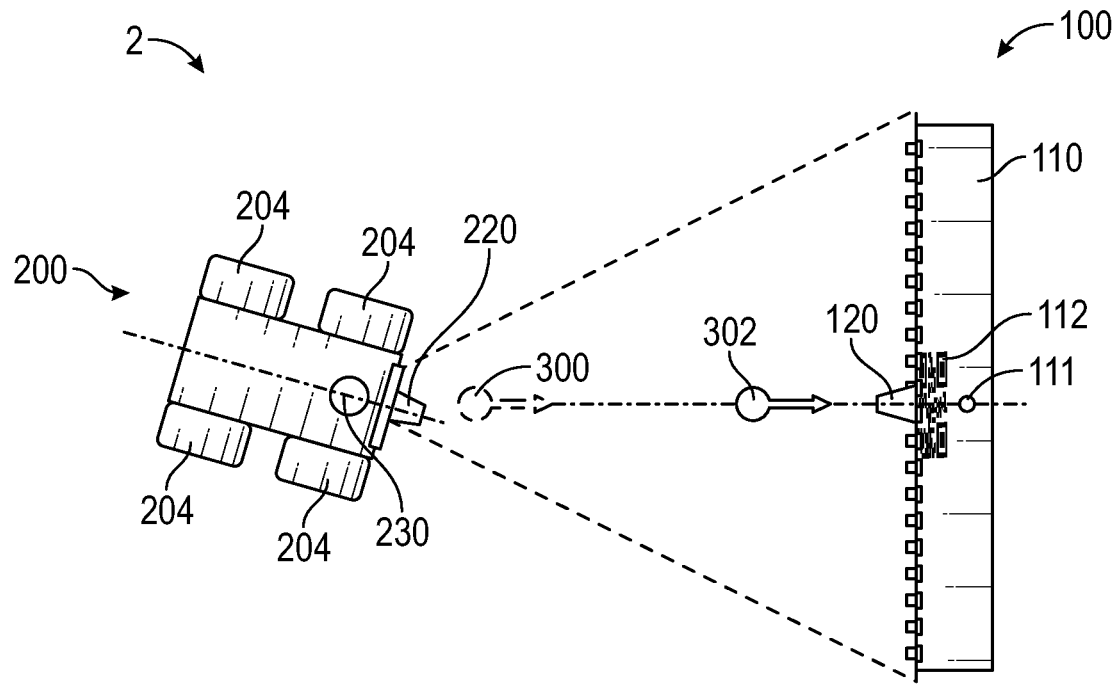
FIG. 4 is schematic view of the docking system of FIG. 2, shown without the track of the docking station, and shown with the AMR attempting to dock at a docking station.

Accordingly, the camera 220 and the lidar system 230 are employed for the perception of the environment around the AMR 200, and in turn, the autonomous software (e.g., via the processor 210) comprises localization, path planning, object detection, leg tracking, and motion control algorithms. Referring to FIG. 4, it can be appreciated that the AMR 200 may begin in an angled and/or non-aligned state, with respect to a position of the docking station 100. This may be typical, for example when the AMR 200 is transporting packages from other locations and is approaching the docking station 100 to dock.

As stated above, in one example the camera 220 and the lidar system 230 may together be employed by the processor 210 (FIG. 2) in order to determine the offset position 300. It will be appreciated that when the AMR 200 is docking at the docking station 100, first moving the AMR 200 to the offset position 300 advantageously allows the AMR 200 to more easily be later moved to the final position 302. Additionally, as stated, the processor 210 (FIG. 2) may further employ the camera 220 and the lidar system 230 together to determine the final position 302, with respect to the docking station 100. Once the offset and final positions 300,302 are determined, the processor 210 can cause the AMR 200 to first be moved to the offset position 300, and then to the final position 302, which may be a docking position (e.g., for charging of the battery 250, FIG. 2).

By employing both the camera 220 and the lidar system 230, desirably precise docking between the AMR 200 and the docking station 100 is advantageously able to be achieved. For example, employing the camera 220 and the lidar system 230 may include scanning the barcode 112 with the camera 220 in order to estimate an actual position of the AMR 200 with respect to the docking station 100. In one example, the barcode 112 may be a QR code or an AprilTag, and the camera 220 may be configured to scan the structure 110 to recognize the barcode 112. In turn, image frames are processed by the processor 210 to determine the relative position between the AMR 200 and the docking station 100. Stated differently, the camera 220 takes image frames of the barcode 112, and a position estimator of the processor 210 in turn determines the relative position between the AMR 200 and the docking station 100. The estimated relative position between the AMR 200 and the docking station 100 may thus be used to determine the offset and final positions 300,302, and also used as error feedback signals for the AMR 200 to approach the offset and final positions 300,302. Moreover, once the actual position of the AMR 200 with respect to the docking station 100 is determined, the offset and final positions 300,302 can be determined therefrom with desirable precision.

Furthermore, in one example the structure 110 has a middle point 111, and the memory 240 (FIG. 2) further has instructions that, when executed by the processor 210, cause the processor 210 to perform operations including scanning the structure 110 with the lidar system 230 to detect the middle point 111, and determining the offset and final positions 300,302 based on the middle point 111. In one example, the structure 110 of the docking station 100 is uniquely shaped (e.g., is tailored and/or corresponds to) to be easily detected by the lidar system 230. It will thus be appreciated that the lidar system 230 may be configured to scan the structure 110 and provide point cloud data, which are in turn is transmitted to and processed by the processor 210 to determine the middle point 111. The lidar system 230 thus allows the AMR 200 to estimate X-position coordinates corresponding to ends of the structure 110 in order to allow the AMR 200 to move at a preferred angle with respect to the docking station when moving to the offset position 300, and then the final position 302.

Accordingly, the estimated relative position between the AMR 200 and the docking station 100 is used to determine the offset and final positions 300,302, and it is also used as error feedback signals for the AMR 200 to approach the offset and final positions 300,302. In this manner, the offset and final positions 300,302 are not just able to be determined by either the camera 220 or the lidar system 230, but are preferably able to be determined in a combined manner, wherein both the camera 220 and the lidar system 230 provide data to the processor 210, which in turn determines the offset and final positions 300,302.

Figure 5:
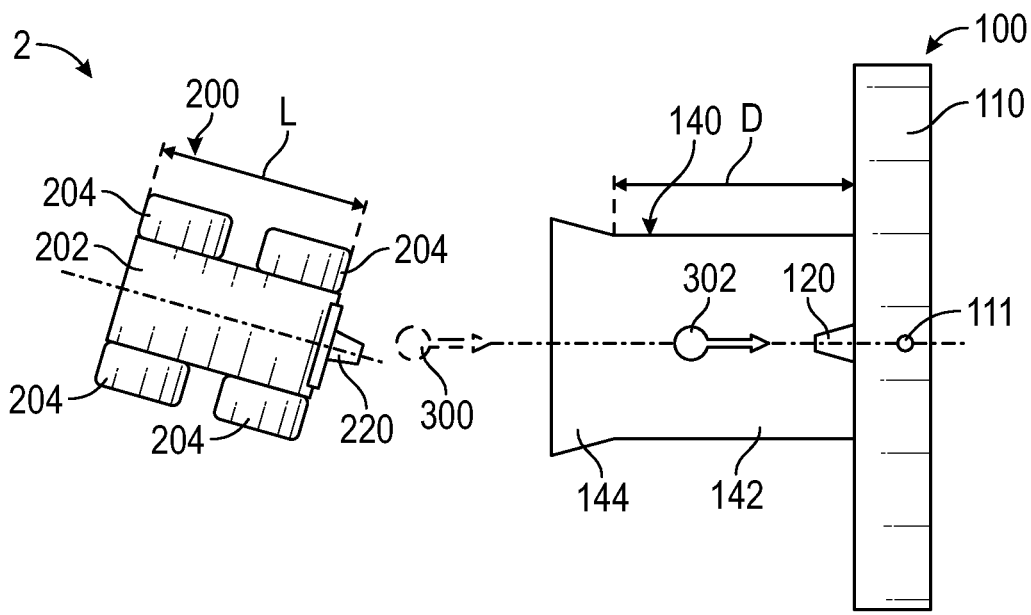
FIG. 5 is another schematic view of the docking system of FIG. 2, shown with the track.

Referring to FIG. 5, as shown, the track 140 is coupled to the structure 110. In one example, docking the AMR 200 at the docking station 100 includes passively aligning the AMR 200 with the track 140. Moreover, the track 140 may include a body 142 and a tapered portion 144 extending from the body 142. In one example, the tapered portion 144 is configured to direct the AMR 200 onto the body 142 such that the AMR 200 is efficiently positioned on the track 140. For example, the AMR 200 may have a length L, and the body 142 of the track 140 may a depth D greater than the length L such that after the AMR 200 has been directed onto the track 140 by the tapered portion 144, the AMR 200 can further be directed and positioned in a docking position (e.g., the final position 302) with the assistance of the track 140. In other words, because the depth D is greater than the length L of the AMR 200, the AMR 200 can be substantially aligned with the docking station 100.

In another example, the processor 210 may be configured to perform operations including receiving feedback from an imaging device responsive to the imaging device taking footage of the AMR 200, and adjusting the offset and final positions 300,302 based on the feedback from the imaging device. The AMR 200 may be provided with a mark, such as a cross mark shown in FIG. 6, on the body 202 in order to allow the imaging device to more properly locate the AMR 200. Employing the imaging device may be useful because the positional feedback to the processor 210 may be susceptible to certain noises, including scratches on the barcode 112, fingerprints on the camera 220, or improper light conditions that might affect the lidar system 230. Accordingly, to make docking with the docking station 100 even more precise, the imaging device, which may be the camera 120 of the docking system 2, may be employed. In one example, the camera 120 is coupled to the structure 110. See, for example, FIGS. 4-6.

In this manner, as the AMR 200 is moving with respect to the docking station 100, the camera 120 is configured to record footage of the AMR 200 (e.g., the position of the AMR 200 with respect to the docking station 100), and in turn the processor 210 is configured to receive feedback (e.g., data) corresponding to the footage of the camera 120. In this manner, the processor 210 may be configured to determine the offset and final positions for docking of the AMR 200 based on the feedback from the camera 220 of the AMR 200, the lidar system 230 of the AMR 200, as well as the camera 120 of the docking station 100, thereby providing for an even greater level of precision during docking. In other words, an external feedback mechanism in the form of the camera 120 is employed to provide more robustness to precise docking between the AMR 200 and the docking station 100.

Figure 6:
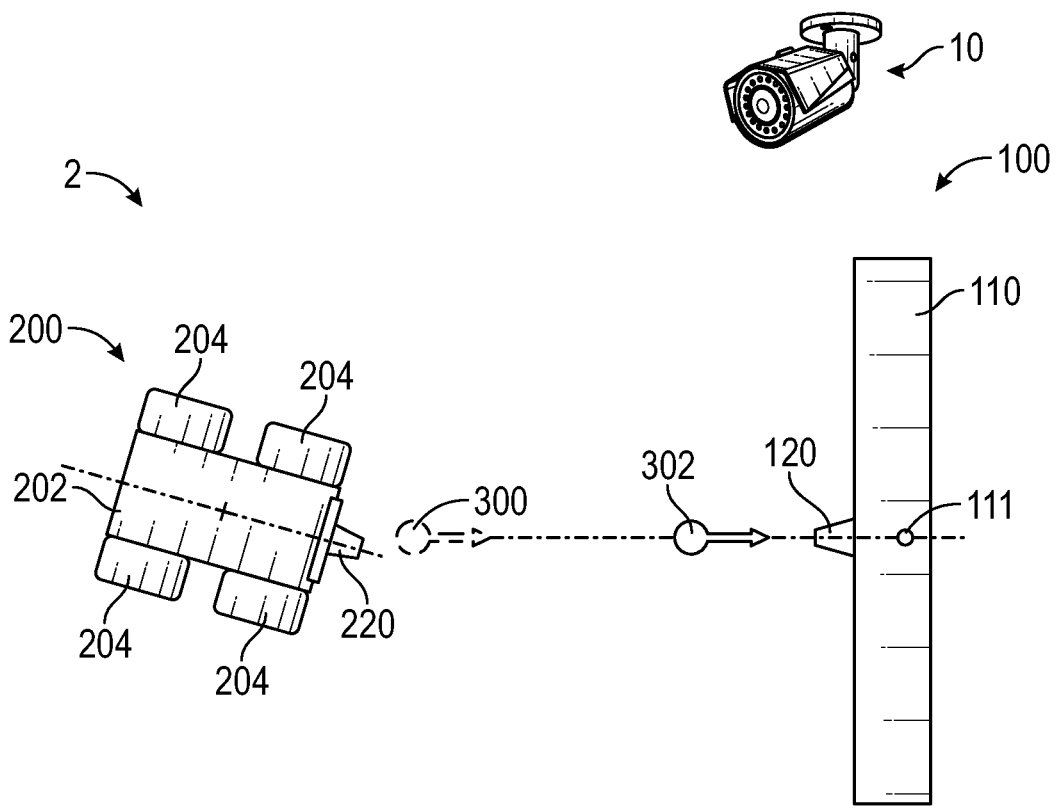
FIG. 6 is another schematic view of the docking system of FIG. 2, shown with the additional camera of the docking system spaced from the AMR and the docking station.

FIG. 6 shows a further aspect of the disclosed concept. As shown, the docking system 2 may further include an imaging device in the form of a camera 10 that is spaced from the structure 110 of the docking station 100. See also, for example, FIG. 2. The camera 10 may be coupled to, for example, a wall of a warehouse in which the AMR 200 is operating. Additionally, the camera 10 may be utilized by the docking system 2 in the same manner as the camera 120 of the docking station 100. That is, the camera 10 may record footage of the AMR 200 (e.g., though from a different vantage than the camera 120), and in turn, the processor 210 of the AMR 200 may be configured to receive feedback (e.g., data) in the form of the footage from the camera 10. Accordingly, the docking system 2 may have a deep learning neural network that receives camera images, and estimates a position of all objects within its view. The position estimates are in turn used to determine the offset and final positions 300,302, and provide the relative location of the AMR 200 with respect to the docking station 100. The AMR 200 can thus be understood to communicate with infrastructure systems (e.g., a warehouse including the camera 10) to receive the positional feedback and perform precise docking maneuvers.

Once the processor 210 has received the feedback from the camera 10, the processor 210 may determine the offset and final positions 300,302 for docking of the AMR 200 based on the feedback from the camera 10, in addition to any feedback from the camera 220, the lidar system 230, and the camera 120. In this manner, the docking system 2 may provide four combined aspects of precision by which the AMR 200 may be docked onto the docking station 100, each individually contributing to and effecting the determination of the offset and final positions 300,302.

In other example, it will be appreciated that a docking system may include either or both of the cameras 10,120, and provide that the memory 240 of the AMR 200 may include instructions that, when executed by the processor 210, cause the processor 210 to perform operations including receiving feedback from the camera 10,120 responsive to the camera 10,120 taking footage of the AMR 200, and docking the AMR 200 at the docking station 100 based on the feedback. Such a system may not require usage of the camera 220 and the lidar system 230. That is, such a docking system may provide for relatively precise docking via data received at the processor 210 from either or both of the cameras 10,120 in isolation or together. The processor 210 in this example docking system may perform the operations including determining the offset position 300 and the final position 302 of the AMR 200 with respect to the docking station 100 using the feedback from the camera 10,120 (e.g., apart from feedback from the camera 220 and the lidar system 230, or in addition to them in an alternative embodiment). Docking the AMR 200 at the docking station 100 may include moving the AMR 200 to the offset position 300 and moving the AMR 200 to the final position 302.

Accordingly, it will be appreciated that a method of docking the AMR 200 at the docking station 100 may include a first step of providing the docking station 100, a second step of providing the AMR 200 with the camera 220 and the lidar system 230, a third step of employing the camera 220 and the lidar system 230 to determine an offset and final position 300,302 of the AMR 200 with respect to the docking station 100, and a fourth step of docking the AMR 200 at the docking station 100 using the offset and final positions 300,302. Additionally, the third step may include scanning the barcode 112 with the camera 220 in order to estimate an actual position of the AMR 200 with respect to the docking station 100. The method may also include steps of scanning the structure 110 with the lidar system 230 to detect the middle point 111, and determining the offset and final positions 300,302 based on the middle point 111. In one example, the method may also include the steps of providing a second camera 10,120, receiving feedback from the second camera 10,120 responsive to the second camera 10, 120 taking footage of the AMR 200, and adjusting the offset and final positions 300,302 based on the feedback.

The processor 210 of the AMR 200 may be a commercially available general-purpose processor, such as a processor from the Intel® or ARM® architecture families. The memory 240 of the AMR 200 may be a non-transitory computer-readable memory storing program code, and can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A docking system, comprising:
   a docking station; and
   an autonomous mobile robot (AMR) comprising:
      a Top hat system mounted to a body for storage of at least one package,
      a processor,
      a camera of the ARM electrically connected to the processor,
      a lidar system electrically connected to the processor of the ARM, and
      a memory of the ARM comprising instructions that, when executed by the processor of the ARM, cause the processor of the ARM to perform operations to:
         employ the camera of the ARM and the lidar system to determine an offset position and a final position of the AMR with respect to the docking station, and
         dock the AMR at the docking station using the offset position and the final position,
      wherein the docking station comprises a structure having a barcode, and wherein employing the camera of the AMR and the lidar system comprises scanning the barcode with the camera of the AMR in order to estimate an actual position of the AMR with respect to the docking station.

2. The docking system according to claim 1, wherein the structure has a middle point, and wherein the memory of the ARM further comprises instructions that, when executed by the processor of the ARM, cause the processor of the ARM to perform operations to:
   scan the structure with the lidar system to detect the middle point; and
   determine the offset position and the final position based on the middle point.

3. The docking system according to claim 1, further comprising a second camera spaced from the AMR, and wherein the memory of the ARM further comprises instructions that, when executed by the processor of the ARM, cause the processor of the ARM to perform operations to:
   receive feedback from the second camera responsive to the second camera taking footage of the AMR; and
   adjust the offset position and the final position based on the feedback.

4. The docking system according to claim 3, wherein the second camera is coupled to the structure of the docking station.

5. The docking system according to claim 3, wherein the second camera is spaced from the structure.

6. The docking system according to claim 3, wherein the AMR has a battery electrically connected to the processor of the ARM, and wherein the docking station is configured to charge the battery and/or replace the battery.

7. The docking system according to claim 3, wherein the docking station further comprises a track coupled to the structure, and wherein docking the AMR at the docking station comprises passively aligning the AMR with the track.

8. The docking system according to claim 7, wherein the track comprises a body and a tapered portion extending from the body, wherein the tapered portion is configured to direct the AMR onto the body, wherein the AMR has a length, and wherein the body has a depth greater than the length.

* * * * *